(12) United States Patent
Ricketts et al.

(10) Patent No.: US 11,731,489 B2
(45) Date of Patent: Aug. 22, 2023

(54) VENTILATION SYSTEM FOR A VEHICLE AND OFF-ROAD VEHICLE INCLUDING SAME

(71) Applicant: Honda Motor Co., Ltd., Tokyo (JP)

(72) Inventors: Brandon E. Ricketts, Marysville, OH (US); Jacob Michael Ruemelin, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 249 days.

(21) Appl. No.: 16/674,148

(22) Filed: Nov. 5, 2019

(65) Prior Publication Data

US 2021/0129628 A1    May 6, 2021

(51) Int. Cl.
*B60H 1/26* (2006.01)
*B60J 1/00* (2006.01)
*B60H 1/28* (2006.01)
*B60R 21/13* (2006.01)
*B60H 1/00* (2006.01)
*B60H 1/34* (2006.01)

(52) U.S. Cl.
CPC .............. *B60H 1/267* (2013.01); *B60H 1/28* (2013.01); *B60J 1/006* (2013.01); *B60R 21/13* (2013.01); *B60H 2001/00707* (2013.01); *B60H 2001/3464* (2013.01)

(58) Field of Classification Search
CPC ...................... B60H 1/267; B60H 1/28; B60H 2001/00707; B60H 2001/3464; B60H 1/30; B60H 1/00407; B60H 1/3435; B60H 1/3428; B60H 1/00564; B60H 1/26; B60H 1/00264; B60H 1/0025; B60J 1/006; B60J 1/20; B60J 1/2002; B60J 1/2005; B60J 1/2008; B60J 1/2094; B60J 1/085; B60J 1/14; B60J 1/007; B60R 21/13; B60R 1/0602; B60P 7/04; F16C 11/04; F16L 3/1058; E05D 7/1066; E04D 13/0357; Y10T 24/44239; Y10T 24/44017; F16B 2/22; F16B 2/20; F24F 7/02; F24F 13/32
USPC .............. 248/74.2; 454/128, 150, 146, 149; 296/91, 96.11
See application file for complete search history.

(56) References Cited

U.S. PATENT DOCUMENTS

| | | | |
|---|---|---|---|
| 2,839,985 A | 6/1958 | Ross | |
| 3,162,112 A * | 12/1964 | Wheeler | B60H 1/30 248/62 |
| 4,407,186 A * | 10/1983 | Izumi | B60H 1/34 137/832 |
| 4,970,946 A | 11/1990 | Ivey | |
| 5,101,711 A * | 4/1992 | Durbin | B60J 1/2088 454/142 |
| 6,073,891 A * | 6/2000 | Humber | F16L 3/13 248/74.5 |
| D453,823 S * | 2/2002 | Wagner | B60H 1/34 D23/370 |
| 6,981,914 B2 | 1/2006 | Veenstra | |
| 8,646,518 B2 * | 2/2014 | Ross | F24D 3/141 165/49 |

(Continued)

Primary Examiner — Steven B McAllister
Assistant Examiner — Cole N Friedman
(74) *Attorney, Agent, or Firm* — Kenealy Vaidya LLP

(57) ABSTRACT

A ventilation system for a vehicle can include a roll over protection system. The roll over protection system can include a bar. The ventilation system can have an air duct configured to selectively attach to and detach from the bar.

14 Claims, 5 Drawing Sheets

(56) References Cited

U.S. PATENT DOCUMENTS

| | | | |
|---|---|---|---|
| D898,555 S * | 10/2020 | LaPoint | B60H 3/0616 |
| | | | D8/355 |
| 2004/0072533 A1 * | 4/2004 | Cho | B60H 3/0616 |
| | | | 454/155 |
| 2004/0152409 A1 * | 8/2004 | Mooney | B60J 1/20 |
| | | | 454/131 |
| 2013/0035026 A1 * | 2/2013 | Coke | B60H 1/30 |
| | | | 454/136 |
| 2016/0252263 A1 * | 9/2016 | Chwala | F24F 7/02 |
| | | | 454/354 |
| 2018/0038401 A1 * | 2/2018 | Cloutier | B60J 10/72 |
| 2018/0244133 A1 | 8/2018 | Luo | |
| 2018/0244135 A1 | 8/2018 | Luo | |
| 2019/0135082 A1 | 5/2019 | Bender | |
| 2019/0270363 A1 * | 9/2019 | Hoerschler | B60H 1/3414 |

* cited by examiner

VENTILATION SYSTEM FOR A VEHICLE AND OFF-ROAD VEHICLE INCLUDING SAME

BACKGROUND

The disclosed subject matter relates to a ventilation system for a vehicle that includes an air duct. More particularly, the disclosed subject matter relates to an air duct that can be selectively attached to and detached from the vehicle.

Side-by-side all-terrain vehicles (SxS) can include windshields at the front and rear of the vehicle. Some windshields have small vents to allow airflow into the cabin, but most glass windshields do not have vents. The windshields with small vents can permit cooling air to flow into the passenger area. However, one or more of the driver and the passenger(s) may perceive the flow rate of cooling air as insufficient while travelling in warm or hot weather. In an effort to increase the flow of cooling air into the passenger space, the driver or passenger might remove the windshield when the vehicle is used during warm weather.

SUMMARY

Some embodiments are directed to a ventilation system for a vehicle. The vehicle can include a roll over protection system. The roll over protection system can include a bar. The ventilation system can have an air duct configured to selectively attach to and detach from the bar.

Some embodiments are directed to a ventilation system for a vehicle. The vehicle can include an air duct. The air duct can include an inlet facing a first direction and an outlet facing a second direction. The second direction can be different from the first direction. The air duct can be configured to receive air along the first direction and redirect air flowing to the air duct to exit the air duct in the second direction such that air outside the vehicle enters the vehicle. An attachment member can be connected to the air duct at a position between the inlet and outlet. The attachment member can be configured to selectively attach the air duct to and detach the air duct from the vehicle.

Some embodiments are directed to an off-road vehicle. An off-road vehicle can include a frame assembly, a plurality of wheels, a rollover protection system, a windshield and an air duct. The plurality of wheels can be rotatably supported on the frame assembly. The rollover protection system can include a plurality of cage members and can be mounted to the frame assembly. The rollover protection system can define a passenger space and a windshield frame. The windshield can be connected to the windshield frame. The airduct can selectively attach to and detach from one of the cage members. The air duct can include an inlet outside of the windshield. The outlet can face toward the passenger space.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
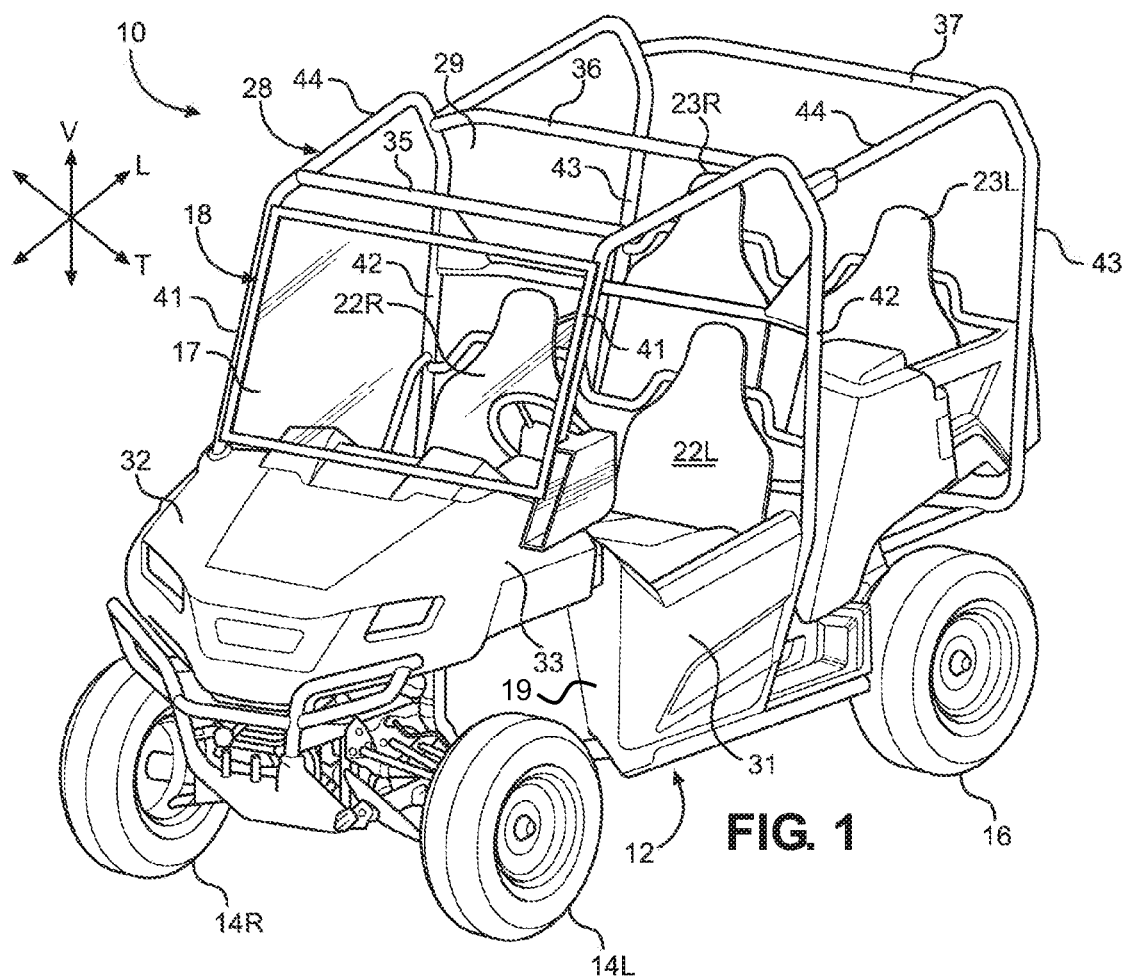
FIG. 1 is a front perspective view of an exterior of a vehicle in accordance with principles of the disclosed subject matter.

A vehicle 10 is shown in FIG. 1. The vehicle 10 can be specialized for use on an unimproved path or on an unmarked path, and can be referred to as a multipurpose utility vehicle (MUV) or as a side-by-side all-terrain vehicle (SxS, or SxS ATV). For example, embodiments are intended to include or otherwise cover any type of automobile, including a passenger car, minivan, truck, other types of all-terrain vehicle (ATV), semi-tractor, off-highway vehicle, etc.

The vehicle 10 can include a windshield 17, a passenger area 29, and a ventilation system 50. The windshield 17 can obstruct the flow of air from outside of the vehicle 10 into the passenger area 29. Under certain environmental conditions, the lack of airflow through the passenger area 29 can be negatively perceived by one or more of the driver and the passenger(s). The ventilation system 50 can direct air that is outside of the vehicle 10 into the passenger area 29 so that the driver/passenger(s) can experience airflow inside the vehicle 10 without resorting to removing the windshield. Thus, the ventilation system 50 can increase the flow of cooling air into the passenger area 29 and maintain the advantage(s) of having the windshield 17 mounted on the vehicle 10.

The vehicle 10 can include a body 12, a pair of front wheels, 14L, 14R, a pair of rear wheels 16, and a frame assembly 18. The vehicle 10 can be provided with a pair of front door assemblies 31, a pair of rear door assemblies, and a powertrain. Portions of the frame assembly 18 and the right rear wheel are hidden from view in FIG. 1 by the body 12 and the powertrain of the vehicle 10 is omitted for simplicity and clarity of the drawings.

The vehicle 10 can include a pair of front seats 22L, 22R and a pair of rear seats 23L, 23R, mounted in the passenger area 29 of the vehicle 10. The frame assembly 18 can include a rollover protection structure 28 configured to extend around and above the seats 22L, 22R, 23L, 23R and the passenger area 29. The rollover protection structure 28 can cooperate with the body 12 and/or at least a portion of the frame assembly 18 to define door openings through which a passenger may pass in order to enter or exit the passenger area 29.

The vehicle 10 can include a powertrain. The powertrain can include an internal combustion engine, one or more electric motor(s) or a hybrid of an internal combustion engine and one or more electric motor(s), or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16, or configured to drive all of the wheels 14L, 14R, 16. The ventilation system 50 can be mounted onto any appropriate portion of the frame assembly 18.

The body 12 can be formed of one or more panel structures 19 mounted on the frame assembly 18. For example, the panel structure 19 can include a panel extending around each of the wheels 14L, 14R, 16. The panel structure 19 can include one or more panels that form a cargo/storage area at the rear of the vehicle 10. The powertrain can be mounted to the frame assembly 18 at a location that is underneath the cargo/storage area. The panel structure 19 can also include floor panels. The frame assembly 18 and/or the floor panels (of the panel structure 19) can support the seats 22L, 22R, 23L, 23R.

The frame assembly 18 can be configured to support the body 12, door assemblies, seats 22L, 22R, 23L, 23R, suspension components for the wheels 14L, 14R, 16, powertrain, steering system, control pedal assemblies, passengers and cargo items, for example. The frame assembly 18 can be configured to withstand various modes of operation, including operation on unimproved paths, and can be configured to surround the passenger area. The frame assembly 18 can include a main frame assembly, a front frame assembly, and a rear frame assembly.

The frame assembly 18 can define the passenger area 29 of the vehicle 10. The frame assembly 18 can also provide an overall bending stiffness and torsional stiffness characteristic for the vehicle 10 that can be advantageous for rugged terrain of an unimproved path.

The frame assembly 18 can be made from any appropriate structural element(s), such as but not limited to tubes, pipes, beams, stampings, etc., that can provide sufficient strength and rigidity for the vehicle 10 including the vehicle passenger area. The frame assembly 18 can be formed from a single type of structural element, or alternatively the frame assembly 18 can be formed from any combination of structural elements. The structural elements can have any appropriate cross-sectional shape, such as but not limited to circular, rectangular, regular polygonal, irregular polygonal, hollow, and/or solid. The structural elements can be variable in material and geometry along the length of the structural element, etc.

The frame assembly 18 can be configured to support other components such as but not limited to a radiator, a steering rack assembly, front drive assembly and a rear drive assembly.

As shown in FIG. 1, the rollover protection structure 28 can extend in the longitudinal direction L of the vehicle 10, from the front end of the passenger area 29 to the rear end of the passenger area 29. The rollover protection structure 28 can define the limits of the passenger area 29 in the transverse direction T of the vehicle 10, the longitudinal direction L of the vehicle 10 and in the vertical direction V of the vehicle 10. The rollover protection structure 28 can be configured to support door assemblies and any appropriate portion(s) of the body 12, such as but not limited to flexible side panel(s), rigid side panel(s), roof panel (rigid or flexible), flexible or rigid rear panel, etc.

The rollover protection structure 28 can be configured to resist, impede, or minimize deformation that could be caused by a load or kinetic energy input into the rollover protection structure 28. The rollover protection structure 28 can be configured with any shape and contour that can be advantageous to mate the structural performance with aesthetic appeal desired for the vehicle 10. The rollover protection structure 28 can be formed from any appropriate number of structural elements, from one to any number greater than one.

The rollover protection structure 28 can include a plurality of cage members 35, 36, 37, 41, 42, 43, 44. The cage members can include a plurality of cage cross members 35, 36, and 37 and a plurality of cage side members 41, 42, 43, and 44. The cage side members 42 can include a left cage side member and a right cage side member. The right side of the rollover protection structure 28 can be mirror image to the left side of the rollover protection structure 28. Each of the cage members 35, 36, 37, 41, 42, 43, 44 can be configured as a hollow tube or pipe having a substantially circular or oval cross-section shape. The cage members 35, 36, 37, 41, 42, 43, 44 can be configured with any appropriate elongated shape that can provide the desired dimensionality of the passenger area and advantageously conform to the aesthetic appearance desired for the vehicle 10. For example, the cage members 35, 36, 37, 41, 42, 43, 44 can be made from one or more lengths of a metal tube. Any one of the tubular cage members can be bent in one or more locations into a predetermined shape. Each of the cage members 35, 36, 37, 41, 42, 43, 44 can be referred to as a bar.

Each of the first cage side members 41 can be referred to as an A-pillar. Each of the first cage side members 41 can be connected at one end to a main frame assembly of the frame assembly 18. Each of the first cage side members 41 can extend along each of the vertical direction V, the transverse direction T and the longitudinal direction L of the vehicle 10.

As shown in FIG. 1, the rollover protection structure 28 can also include fourth cage side members 44. Each of the fourth cage side members 44 can be referred to as a roof rail or a top rail. Each of the fourth cage side members 44 can extend from and connect to a respective one of the first cage side members 41. Each of the fourth cage side members 44 can connect to a respective one of the third cage side members 43. Each of the fourth cage side members 44 can connect to a respective one of second cage side members 42. Each of the fourth cage side members 44 can extend along at least the longitudinal direction L of the vehicle 10.

The first cage cross member 35 can be connected to either the first cage side members 41 or the fourth cage side members 44 at a location that is adjacent to or at the junction of the first cage side members 41 and the fourth cage side members 44. Alternatively, the first cage cross member 35 can be connected at the junction of the first cage side members 41 and the fourth cage side members 44.

Each of second cage side members 42 can be referred to as a B-pillar. Each of the second cage side members 42 can be connected at a first end, either directly or indirectly, to the main frame assembly of the frame assembly 18. Each of the second cage side members 42 can be connected at a second end to a respective one of the fourth cage side members 44. The second cage cross member 36 can be connected to either the fourth cage side members 44, or the second cage side members 42, or a location that is adjacent to or at the junction of the fourth cage side members 44 and the second cage side members 42.

Each of third cage side members 43 can be referred to as a C-pillar. Each of the third cage side members 43 can be connected at a first end to the main frame assembly of the frame assembly 18. Each of the third cage side members 43 can be connected at a second end to a respective one of the fourth cage side members 44.

The third cage cross member 37 can be connected to either the fourth cage side members 44, or the third cage side members 43, or alternatively, at a location that is adjacent to or at the junction of the fourth cage side members 44 or the third cage side members 43.

The cage cross members 35, 36, 37, can extend in the transverse direction T of the vehicle 10 from the left side of the rollover protection structure 28 to the right side of the rollover protection structure 28. The cage cross members 35, 36, 37 can define limits of the passenger area 29 in the longitudinal direction L of the vehicle 10 and the vertical direction V of the vehicle 10. The cage cross members 35, 36, 37 can be connected to a respective left-side and right-side pair of the cage side members 41, 42, 43, 44 by welding.

The windshield 17 can be mounted on and span between the first side cage members 41. The windshield 17 can be permanently fixed to the first side cage members 41 in any appropriate manner such as but not limited to mechanical fasteners, welds, or adhesives. In alternative embodiments, the windshield 17 can be removably mounted on the first cage side members 41 in any appropriate manner such as but not limited to threaded fasteners and/or clamps. The windshield 17 can be fixed in a single position with respect to the first side frame members 41. In alternate embodiments, the windshield 17 can move relative to the first side frame members 41. In alternate embodiments, the windshield 17 can include one or more movable panels.

The ventilation system 50 can be selectively attached to and detached from any appropriate portion of the rollover protection system 28. FIG. 1 shows the ventilation system attached to the first cage side member 41. Alternate embodiments can include a ventilation system 50 mounted on the first cage cross member 35. Alternate embodiments can include a ventilation system 50 for each of the driver and passenger(s). The ventilation system 50 can redirect air that is outside of the vehicle 10 to flow into the passenger area 29.

Figure 2:
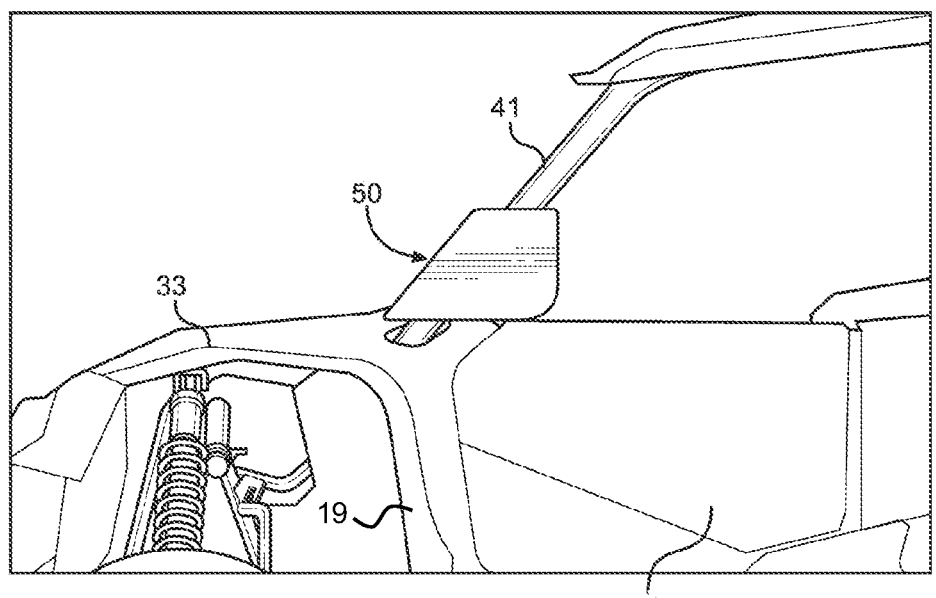
FIG. 2 is a partial side view of the vehicle assembly of FIG. 1.

With reference to FIG. 2, the side of the ventilation system 50 that faces away from the first cage side member 41 can have a trapezoidal shape. The ventilation system 50 can be attached to the first cage side member 41, while being spaced away from the hood 32 and/or the fender 33 of the vehicle 10. The ventilation system 50 can be mounted adjacent to the windshield 17 so that air outside of the vehicle 10 can enter the ventilation system 50. The ventilation system 50 can then redirect the air towards and into the passenger area 29.

Figure 3:
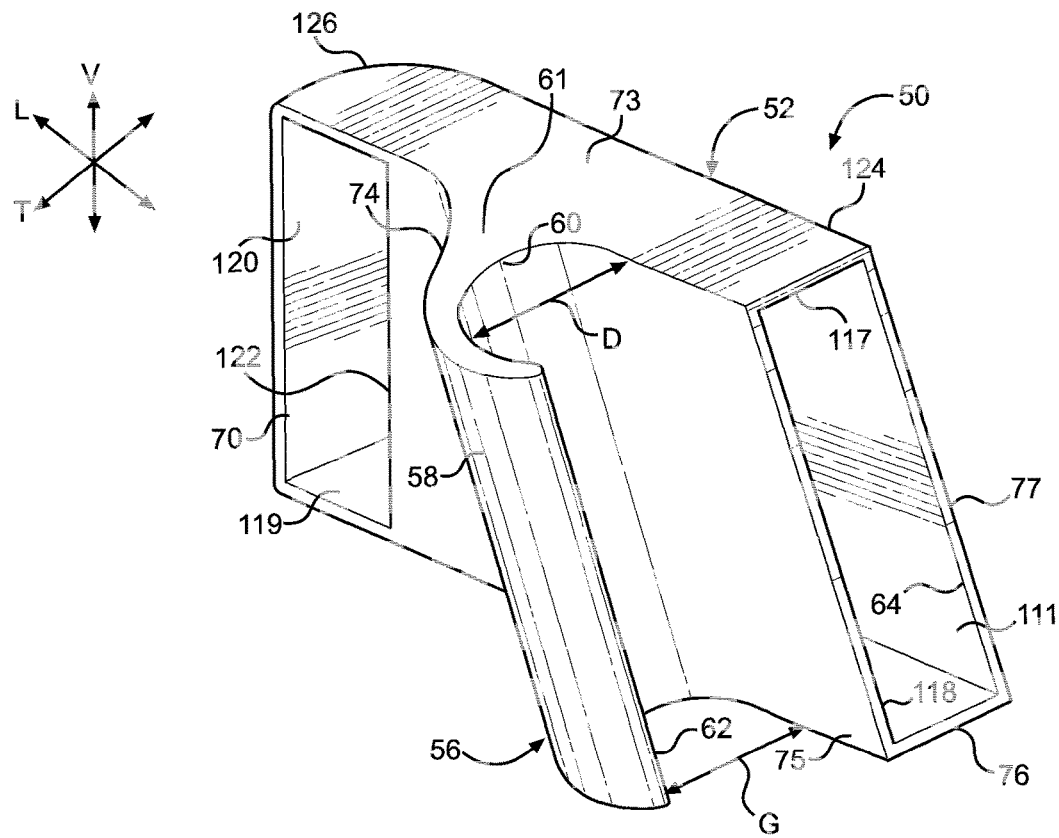
FIG. 3 is a perspective view of a ventilation system of the vehicle of FIG. 1.

With reference to FIG. 3, the ventilation system 50 can include an air duct 52 with an inlet opening 64 and an outlet opening 70 in fluid communication with each other via an air passageway 111 that extends through the air duct 52 from the inlet opening 64 to the outlet opening 70. The ventilation system 50 can also include an attachment structure 56 that selectively attaches the air duct to the vehicle 10.

The air duct 52 can include a top wall 73, bottom wall 76, a first side wall 75 and second side wall 77. The air duct 52 can be an injection molded plastic part that is molded as a unitary homogenous component.

Each of the walls 73, 75, 76, 77 can include an inner surface 117, 118, 119, 120. The inner surfaces 117, 118, 119, 120 can form the air passageway 111.

The inlet opening 64 and the outlet opening 70 can be bounded by the walls 73, 75, 76, 77. The outlet opening 70 can be formed in and extend through the first side wall 75. The inlet opening 64 can extend from the inner surface 119 of the bottom wall 76 to the inner surface 117 of the top wall 73, and from the inner surface 118 of the first side wall 75 to the inner surface 120 of the second side wall 77. The outlet opening 70 can extend from the inner surface 119 of the bottom wall 76 to the inner surface 117 of the top wall 73, and from the inner surface 120 of the second side wall 77 to an edge 122 of the first side wall 75.

The inlet opening 64 and the outlet opening 70 can face different directions. The inlet opening 64 can be positioned outside of the vehicle 10 and can face the front of the vehicle 10 in the longitudinal direction L of the vehicle 10. The outlet opening 70 can face the passenger area 29 in the transverse direction T of the vehicle 10. The inlet and outlet openings 64, 70 can have any appropriate shape, such as but not limited to a rectangular shape, in order to achieve the desired air flow into, through, and out of the air duct 52. The outlet opening 70 can face in a direction that is perpendicular to the longitudinal axis L of the vehicle 10 and lie in a plane that extends in the longitudinal direction L and the vertical direction V of the vehicle 10. That is, the outlet opening can face in the transverse direction T of the vehicle 10. The inlet opening 64 can line in a plane that is inclined at an acute or obtuse angle relative to the longitudinal and vertical directions L, V of the vehicle 10. The inlet opening 64 can lie in a plane that extends in the transverse direction T of the vehicle 10.

The air passageway 111 can be defined by the walls 73, 75, 76, 77. The inner surfaces 117, 118, 119, 120 can be smooth surfaces, so that air flows without disruption from the inlet opening 64 to the outlet opening 70. The inlet opening 64 can receive air flow from outside of the vehicle 10 and distribute that air flow via the air passageway 111 to the outlet opening 70. As a result, the passengers may receive air flow inside of the vehicle 10.

The second side wall 77 can include a flat portion 124 and a curved portion 126 that can facilitate the change in direction of the air flow from the longitudinal direction L of the vehicle 10 to the transverse direction T of the vehicle 10. The curved portion 126 can be connected to the top wall 73 and the bottom wall 76. The curved portion 126 can extend along the outlet opening 70, and can extend from the outlet opening 70 to the flat portion 124.

The attachment structure 56 can be connected to the air duct 52 at a location between the inlet opening 64 and the outlet opening 70. The attachment structure 56 can be configured to selectively attach to and detach from any appropriate portion of the vehicle 10 such that the ventilation system 50 can be repeatedly installed on and removed from the vehicle 10 in a non-destructive manner. The attachment structure 56 can be configured to be connected to any appropriate portion of the vehicle 10 without the use of a tool.

Figure 4:
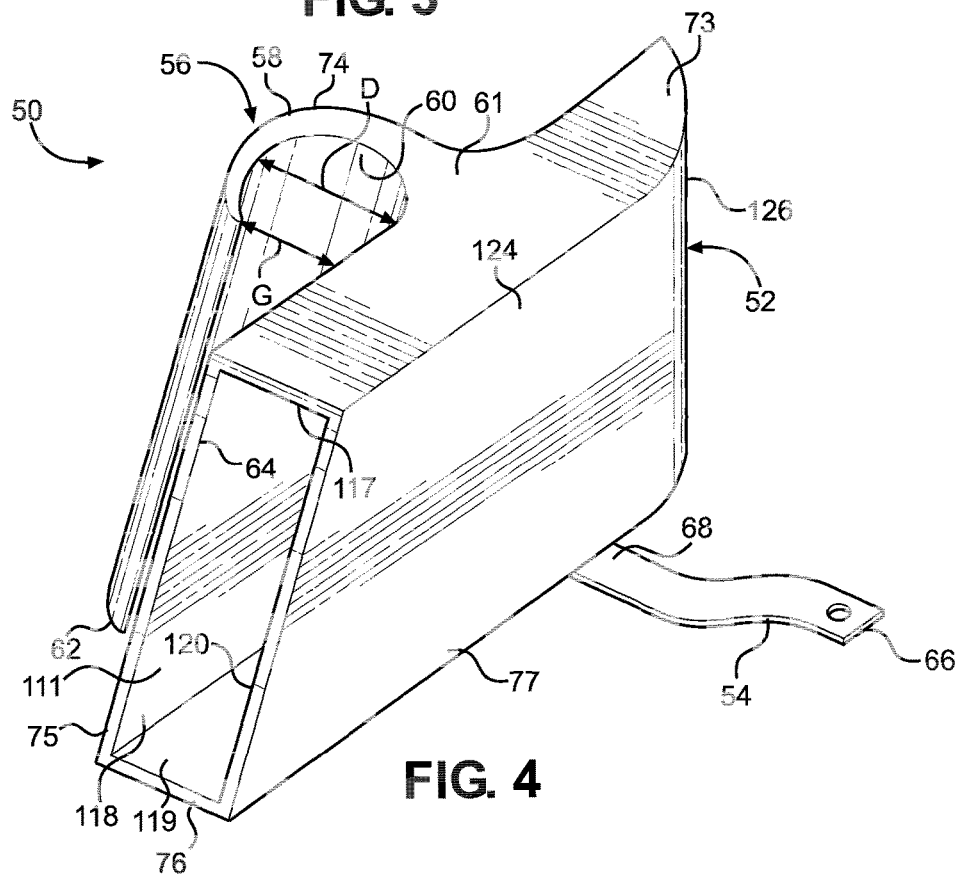
FIG. 4 is another perspective view of the ventilation system of FIG. 1.
Figure 5:
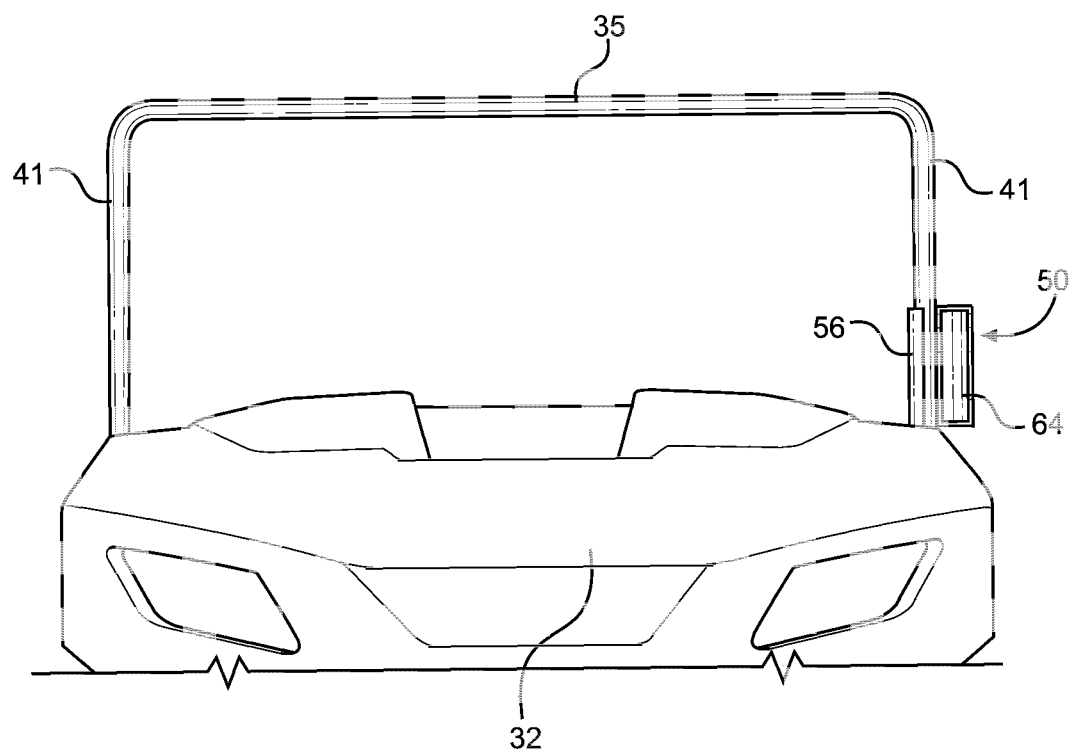
FIG. 5 is a partial front view of the vehicle assembly of FIG. 1.
Figure 6:
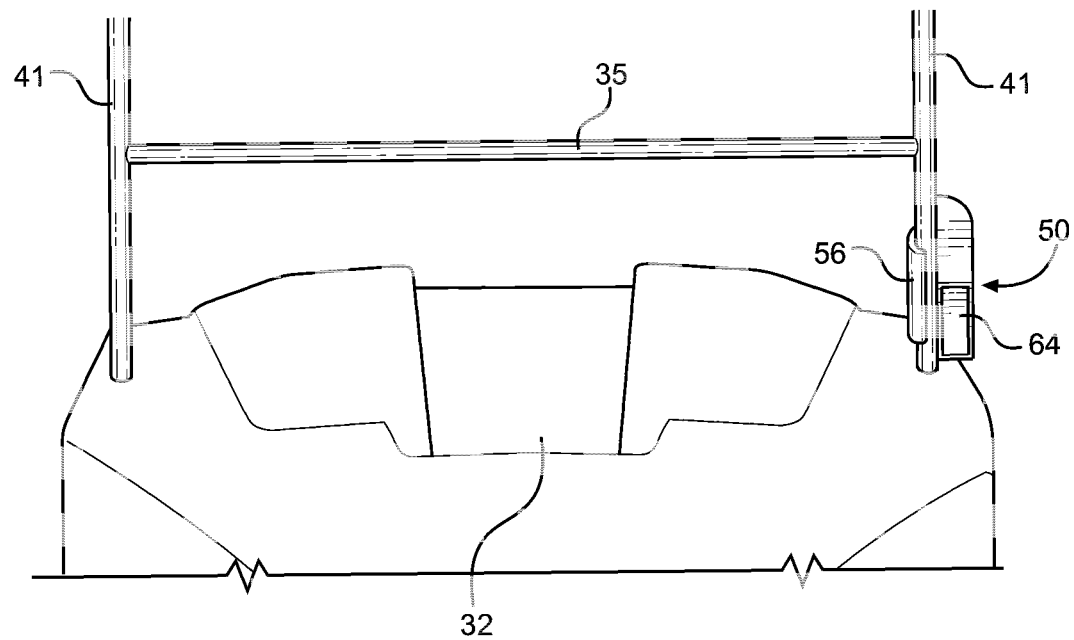
FIG. 6 is a partial top view of the vehicle assembly of FIG. 1

Referring to FIGS. 3 and 4, the attachment structure 56 can be configured to elastically deform as the attachment structure 56 engages the first cage side member 41 during the attachment of the ventilation system 50 to vehicle 10 and during detachment of the ventilation system 50 from the vehicle 10. Referring to FIGS. 5 and 6, the attachment structure 56 can be configured to wrap around at least a portion of the first cage side member 41 when the attachment structure 56 is connected to the first cage side member 41. The windshield 17 is omitted from FIGS. 5 and 6 to more clearly show the ventilation system 50.

Referring to FIGS. 3 and 4, the attachment structure 56 can include a flexible attachment wall 58, a base 61 and a free end 62. The base 61 can be connected to the first side wall 75 that faces the vehicle 10. The attachment wall 58 can extend away from the first side wall 75 along the transverse direction T and the longitudinal direction L of the vehicle 10. The attachment wall 58 can terminate at the free end 62.

The attachment wall 58 can have a curved outer surface 74 and a curved inner surface 60. The curved inner surface 60 and the curved outer surface 74 can be cylindrical surfaces. The curved outer surface 74 and the curved inner surface 60 can have different centers of curvature such that the attachment wall 58 tapers from the base 61 to the free end 62. The diameter D of the inner curved surface 60 can be smaller than the outer diameter of the first cage side member 41 of the vehicle 10 to create an interference fit.

The attachment wall 58 can be cantilevered to the first side wall 75 and can extend away from the first side wall 75 along the transverse direction T of the vehicle 10 and the longitudinal direction L of the vehicle 10.

The base 61 of the attachment structure 56 can extend from the top wall 73 to the bottom wall 76.

The free end 62 can be spaced away from the first side wall 75 by a gap G. The attachment wall 58 can be configured to elastically deform such that the first cage side member 41 deflects the free end 62 away from the first side wall 75 and increases the gap G between the free end 62 and the first side wall 75. That is, the gap G can be less than the outer diameter of the first cage side member 41. Further, FIG. 3 shows that the gap G can be less than the diameter D of the inner curved surface 60. As a result, the ventilation system 50 can be repeatedly and selectively attached to and detached from the first cage side member 41 in a nondestructive manner and with the use of a tool.

Further, the elastic deformation of the attachment structure 56 can create a reaction force in the attachment structure 56 that increases the frictional contact between the attachment structure 56 and the first cage side member 41 when the curved inner surface 60 fully engages the first cage side member 41. This reaction force can limit or prevent or reduce vibration or other movement of the ventilation system 50 along the first cage side member 41.

The attachment structure 56 can be at an acute or obtuse angle with respect to the vertical axis V and the longitudinal axis L of the vehicle 10. For example, the attachment structure 56 and inlet opening 64 can be oriented at the same angle or at a similar angle. Further, the inclination of the attachment structure 56 and the inlet opening 64 can be the same as or similar to an angle of inclination of the first cage side member 41.

The curved inner surface 60 of the attachment structure 56 can selectively attach to and detach from the first cage side member 41 via an interference fit.

The attachment structure 56 can be configured to detach from the vehicle 10 if the air vent 52 (also referred to as an air duct) strikes an object outside of the vehicle 10. Thus, the attachment structure 56 can reduce or avoid damage to the ventilation system 50.

Referring to FIG. 4, the ventilation system 50 can include a tether 54 that has a first end 66 connected to the vehicle 10 and a second end 68 that is connected to the air vent 52. Thus, the tether 54 can connect the ventilation system 50 to the vehicle 10 if the attachment structure 56 detaches from the vehicle 10. The tether 54 can be made from any appropriate material such as but not limited to plastic, fabric, metal or a composite material. The tether 54 can be connected to the vehicle 10 and the air vent 52 in any appropriate manner such as but not limited to mechanical fasteners, adhesives, and welds.

Figure 7:
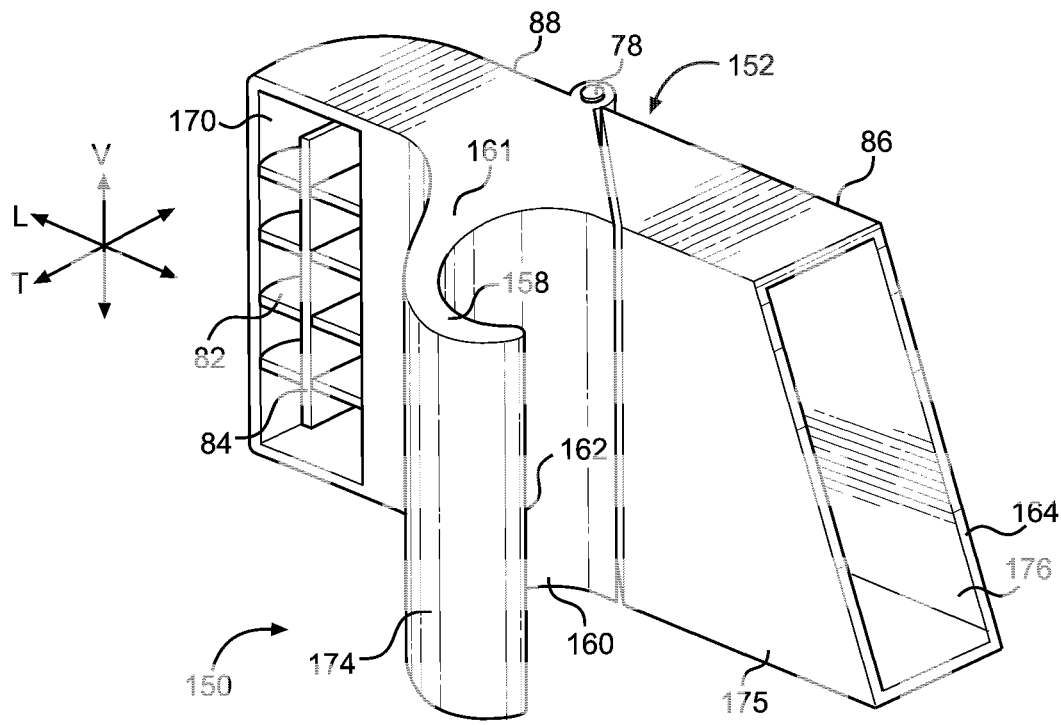
FIG. 7 is a perspective view of an alternate embodiment of a ventilation system in accordance with the principals of the disclosed subject matter and in a first position.
Figure 8:
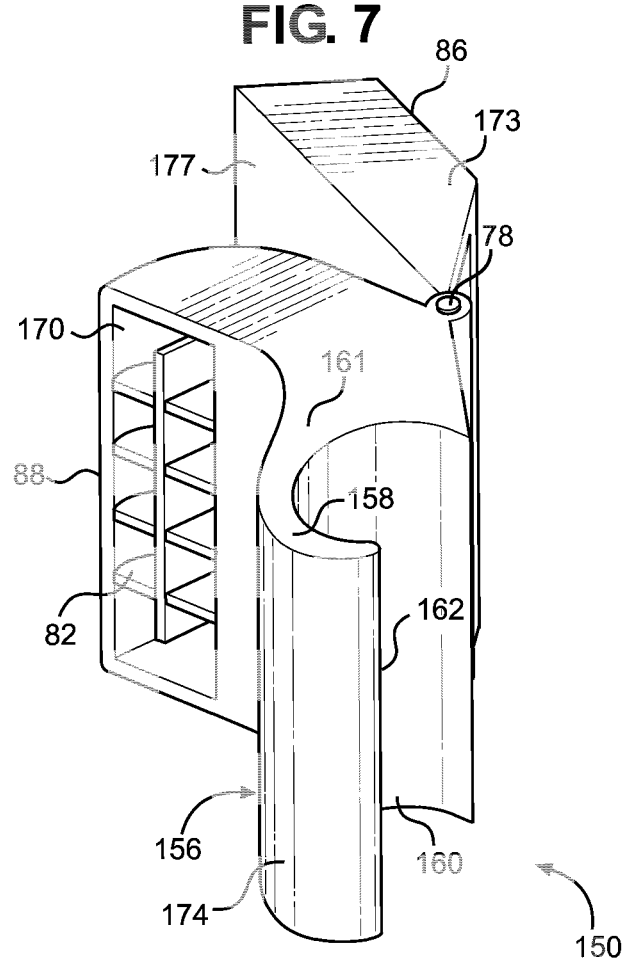
FIG. 8 is a perspective view of the ventilation system of FIG. 7 in a second position.
Figure 9:
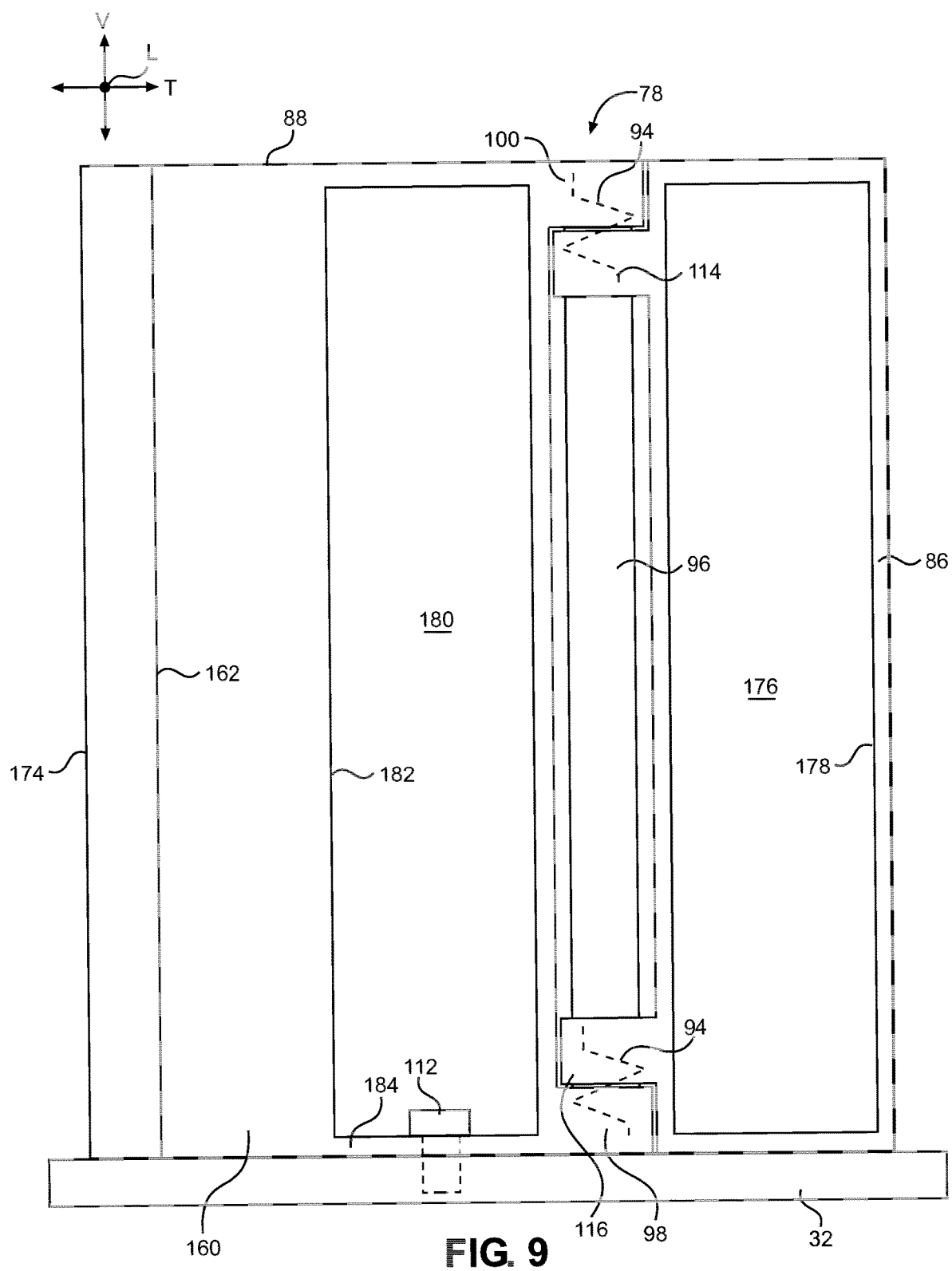
FIG. 9 is a front view of the ventilation system of FIG. 7 in the second position.

FIGS. 7-9 show an alternative embodiment of a ventilation system 150. The ventilation system 150 can include an air duct 152 split into a first hinged member 86 and a second hinged member 88. A hinge assembly 78 can connect the first hinged member 86 to the second hinged member 88. The second hinged member 88 can include an attachment structure 156 that connects the second hinged member 88 to the vehicle 10. The first hinged member 86 can pivot relative to the second hinged member 88 via the hinge assembly 78. The hinge assembly 78 and the attachment structure 56 can be configured such that when an object outside of the vehicle strikes the first hinged member 86 during forward movement of the vehicle 10, the attachment structure 156 can maintain the connection with the vehicle 10 and the first hinged member 86 can pivot via the hinge assembly 78. FIG. 7 shows the first hinged member 86 in a first position in which the first hinged member 86 is aligned with and abuts the second hinged member 88. FIGS. 8 and 9 show the first hinged member 86 in a second position in which the first hinged member is misaligned with and spaced away the second hinged member 88.

The attachment structure 156 can include an attachment wall 158, a base 161 and a free end 162 as described above with respect to the attachment wall 58, the base 161 and the free end 62 of FIGS. 3-6. The attachment wall 158 can be oriented to extend along the vertical direction V of the vehicle 10 as shown in FIGS. 7 and 8, or the attachment wall 158 can be inclined with respect to the vertical direction V and the longitudinal direction L of the vehicle 10 as shown by the exemplary attachment wall 58 of FIGS. 3-6. For example, the axes of the curved surfaces 160, 174 can be inclined with respect to the longitudinal direction L and the vertical direction V of the vehicle 10.

The first hinged member 86 can include a first portion of an air duct 152 and an inlet opening 164. The second hinged member 88 can include a second portion of the air duct 52, the attachment structure 156, and the outlet opening 170. The first hinged member 86 can pivot relative to the second hinged member 88 between a first position and a second position. In the first position shown in FIG. 7, the first hinged member 86 can be aligned with the second hinged member 88 and abut the second hinged member 88 and the first hinged member 86. In the first position, the second hinged member 88 can be in fluid communication with each other. In the second position shown in FIGS. 8 and 9, the first hinged member 86 can be spaced away from and misaligned with the second hinged member 88. In the second position, fluid communication between the first hinged member 86 and the second hinged member 88 can be terminated.

Referring to FIG. 9, the first hinged member 86 can include a first air passageway 176 and a first intermediation outlet opening 178. Referring to FIGS. 7-9 collectively, the first air passageway can extend from the inlet opening 164 to the first intermediate outlet opening 178.

Referring to FIG. 9, the second hinged member 88 can include a second air passageway 180 and a second intermediate inlet opening 182. Referring to FIGS. 7-9 collectively, the second air passageway 180 can extend from the second intermediate inlet opening 182 to the outlet opening 170. When the first hinged member 86 is in the first position, the first intermediate outlet opening 178 is aligned with, faces, and is in fluid communication with the second inlet opening 182. Further, the first air passageway 176 is aligned with the second air passageway 180 and is in fluid communication with the second passageway via the openings 178, 182.

In the second position shown in FIGS. 8 and 9, the first hinged member 86 is spaced away from the second hinged member 88 along the transverse direction T of the vehicle 10 such that the second hinged member 88 is located between the vehicle 10 and the first hinged member 86 when the first hinged member 86 is in the second position. When the first hinged member 86 is in the second position, the first intermediate outlet opening 178 is misaligned with, faces away from the second intermediate inlet opening 182, and is not in fluid communication with the second inlet opening 182. Further, the first air passageway 176 is misaligned with and spaced away from the second air passageway 180, and is not in fluid communication with the second passageway.

Referring to FIGS. 7 and 8, the ventilation system 150 can include louvers 82 and a control arm 84 located adjacent within the second air passageway 180. The control arm 84 and the louvers 82 can be adjacent to the outlet opening 170. The control arm 84 and/or the louvers 82 can extend through the outlet opening 170. The control arm 84 and the louvers 82 can be movably mounted in the second air passageway. The control arm 84 can be attached to the louvers 82 to orientate the louvers 82 in different positions to vary the direction relative to the transverse direction T and/or the vertical direction V at which air flowing in the second air passageway 180 exits through the outlet opening 170. The control arm 84 can orientate the louvers 82 manually or by a powered actuator.

FIG. 9 schematically illustrates the hinge assembly 78. The hinge assembly 78 can include at least one spring 94, a hinge pin 96, and a plurality of hinge knuckles 98, 100, 114, 116. The first and second hinge knuckles 98, 100 can be spaced apart from each other and integral portions of the second hinged member 88. The third and fourth hinge knuckles 114, 116 can be spaced apart from each other and integral portions of the first hinged member 86. The third and fourth hinge knuckles 114, 116 can be located between the first and second hinge knuckles 98, 100 Each of the hinge knuckles 98, 100, 114, 116 can include a through hole through the hinge pin 96 extends.

The spring 94 can be placed on an end of the hinge pin 96. One portion of the spring 94 can be secured to the second hinge knuckle 100 and another portion of the spring 94 can be secured to the third knuckle 114 such that energy is stored in the spring 94 as the first hinged member 86 pivots from the first position to the second position and energy is released as the first hinged member 86 pivots from the second position to the first position. The spring 94 can be any appropriate spring such as but not limited to a coiled torsion spring or a leaf spring. Alternate embodiments can include the spring 94 connected to the first and fourth hinge knuckles 98, 116 instead of, or in addition to, the spring 94 that is connected to the second and third hinge knuckles 100, 114

The attachment structure 156 can pivot about the first cage side member 41 because the cylindrical curved inner surface 160 is complimentary in shape to the cylindrical first cage side member 41. Thus, the ventilation system 150 can include a fastener 112 that connects the second hinged member 88 to another portion of the vehicle 10 such as but not limited to the hood 32 or the fender 33. The fastener 112 can be mounted in the air passageway 111. The fastener 112 can extend through the bottom wall 184 of the second hinged member 88 to the hood 32 or a fender 33 of the vehicle 10. The fastener 112 can provide a reaction torque to the second hinged member 88 so that the second hinged member 88 does not pivot when the first hinged member 86 pivots between the first and second positions.

Thus, the ventilation system can redirect air outside of the vehicle 10 to flow into the passenger area 29 without moving or removing the windshield 17. Further, the ventilation system can be repeatedly and selectively attached to and detached from a desired portion of the vehicle 10 in a non-destructive manner. Further still, the ventilation system can be attached and detached with or without the use of a tool.

While certain embodiments of the invention are described above, it should be understood that the invention can be embodied and configured in many different ways without departing from the spirit and scope of the invention.

Although the air vent 52 and the attachment structure 56 described above can be formed of a plastic material using an injection molding process, alternate embodiments of the air duct 52 can be formed by any metal, plastic, carbon fiber, fiberglass or other composite material.

Instead of an attachment wall 58 as shown in FIGS. 3-9, the attachment structure 56 can include one more permanent magnets, one or more cable tie(s), one or more hook and loop fastener(s), one or more zip tie(s), or any combination thereof connected to or insert molded in the first side wall 75. Further, the attachment structure 56 can have any appropriate shape that can facilitate selective and non-destructive attachment to and detachment from the desired portion of the vehicle.

Instead of a unitary homogenous part, alternate embodiments of the ventilation system 50 can include an attachment structure that is formed separately from the air vent 52 and connected to the air vent 52 in any appropriate manner such as but not limited to mechanical fasteners, an interference fit, welds or adhesives. Alternate embodiments of the air vent 52 can include forming any number of the walls 73, 75, 76, 77 separately and joining the separately formed wall(s) to the other wall(s) in any appropriate manner such as but not limited to mechanical fasteners, an interference fit, welds or adhesives.

Instead of offset cylindrical surfaces, the attachment wall 58 can include inner and outer cylindrical surfaces that are concentric.

Although the louvers 82 are shown in the exemplary embodiment of FIGS. 7 and 8, the exemplary embodiment of FIGS. 3 and 4 can include the louvers 82.

FIGS. 1-9 show the air ducts 52, 152 as having a rectangular cross-sectional shape. However, alternate embodiments can include an air duct having any appropriate shape such as buy not limited to a circular shape, an oval shape, a D-shape, a rectangular shape with rounded corners, any polygonal shape, or any irregular shape.

What is claimed is:

1. A ventilation system for a vehicle, the vehicle includes a roll over protection system and the roll over protection system includes a bar, the ventilation system comprising:
    an air duct configured to selectively attach to and detach from the bar, and includes an inlet, an outlet and a first wall extending from the inlet to the outlet; and
    an attachment member connected to the first wall of the air duct, the attachment member includes,
        a base connected to the first wall of the air duct, and
        an attachment wall that extends away from the base and terminates at a free end, the free end is spaced away from the first wall of the air duct to form a gap between the first wall and the free end that has a predetermined distance that is smaller than a predetermined dimension of the bar, and the attachment wall has a curved inner surface with a predetermined diameter, and the predetermined diameter is greater than the predetermined distance, the attachment wall includes a curved outer surface having a predetermined first curvature and the curved inner surface having a predetermined second curvature that is different from the predetermined first curvature, each of the curved inner surface and the curved outer surface is a cylindrical surface, and the curved inner surface has a first center of curvature and the curved outer surface has a second center of curvature that is different from the first center of curvature.

2. The ventilation system according to claim 1, wherein the free end is configured to elastically deform during selective attaching of the attachment member to the bar or selective detaching of the attachment member from the bar.

3. The ventilation system according to claim 1, wherein the air duct includes, a plurality of walls connected to each other and to the first wall to form an air passageway, an inlet in fluid communication with the air passageway, and an outlet in fluid communication with the air passageway.

4. The ventilation system according to claim 3, wherein the attachment member is connected to the air duct at a location that is between the inlet and the outlet.

5. The ventilation system according to claim 3, wherein the plurality of walls includes a second wall spaced away from the first wall such that the air passageway extends along each of the first wall and the second wall, the inlet extends from the first wall to the second wall, and the outlet extends through the first wall.

6. The ventilation system according to claim 5, wherein the plurality of side walls includes a third wall and a fourth wall spaced away from the third wall, the third wall is connected to and extends from each of the first wall and the second wall, and the fourth wall is connected to and extends from each of the first wall and the second wall, the inlet extends from the third wall to the fourth wall, and the outlet is bounded by each of the first wall, the second wall, the third wall, and the fourth wall.

7. The ventilation system according to claim 6, wherein the second wall includes, a flat portion that extends from the inlet, and a curved portion that is connected to the third wall and the fourth wall, extends along the outlet, and extends from the outlet to the flat portion.

8. The ventilation system according to claim 7, wherein the inlet faces a first direction, the attachment member extends from the third wall to the fourth wall, and the outlet faces a second direction that is different from the first direction.

9. The ventilation system according to claim 1, wherein the air duct includes, a first air duct member that includes the inlet and a first opening, a second air duct member that includes the outlet and a second opening, a hinge assembly that connects the first air duct member to the second air duct member such that the first duct member pivots between a first position and a second position, the first opening and the second opening are in fluid communication with each other when the first duct member is in the first position, and the fluid communication between first opening and the second opening is terminated when the first duct member is in the second position.

10. A ventilation system for a vehicle comprising:

an air duct that includes an inlet facing a first direction and an outlet facing a second direction that is different from the first direction, the air duct is configured to receive air along the first direction and redirect air flowing through the air duct to exit the air duct in the second direction such that air, from outside the vehicle, enters the vehicle; and an attachment member connected to the air duct at a position between the inlet and outlet, the attachment member is configured to selectively attach the air duct to and detach the air duct from the vehicle, wherein the air duct includes, a first air duct member that includes the inlet, a first outer wall, and a first opening, a second air duct member that includes the outlet, a second outer wall, and a second opening, a hinge assembly that connects the first air duct member to the second air duct member such that the first duct member pivots between a first position and a second position, the first opening and the second opening are in fluid communication with each other when the first duct member is in the first position, and the fluid communication between first opening and the second opening is terminated when the first duct member is in the second position, in the first position, the first outer wall and the second outer wall are coplanar and in the second position the first outer wall and the second outer wall face toward each other, and the hinge assembly includes, a hinge pin connected to each of the first air duct member and the second air duct member, and a spring connected to each of the first and second air duct members such that the spring biases the first air duct member toward the first position.

11. The ventilation system according to claim 10, the ventilation system further comprising a retention tether that is connected to the air duct and configured to secure the air duct to the vehicle when the attachment member is selectively detached from the vehicle.

12. The ventilation system according to claim 10, further comprising:

a plurality of louvers movably mounted in the air duct and adjacent to the outlet; and a louver arm attached to the louvers and configured to pivot the louvers relative to the outlet.

13. An off-road vehicle comprising:

a frame assembly;

a plurality of wheels rotatably supported on the frame assembly;

a roll overprotection system that includes a plurality of cage members and is mounted to the frame assembly, and the roll overprotection system defines a passenger space and a windshield frame, the plurality of cage members includes a first cage member having a predetermined dimension;

a windshield connected to the windshield frame; and an air duct that selectively attaches and detaches from one of the cage members, the air duct includes an inlet outside of the windshield, an outlet that faces toward the passenger space, and a wall that extends from the inlet to the outlet; and an attachment member connected to the wall of the air duct, the attachment member includes,
  a base connected to the wall of the air duct,
  an attachment wall that extends away from the base and terminates at a free end, the free end is spaced away from the wall of the air duct to form a gap between the wall and the free end that has a predetermined distance that is smaller than a predetermined dimension of the one of the cage members, and
  the attachment wall has a curved inner surface with a predetermined diameter, and the predetermined diameter is greater than the predetermined distance,
  the attachment wall includes a curved outer surface having a predetermined first curvature and the curved inner surface having a predetermined second curvature that is different from the predetermined first curvature,
  each of the curved inner surface and the curved outer surface is a cylindrical surface, and
  the curved inner surface has a first center of curvature and the curved outer surface has a second center of curvature that is different from the first center of curvature.

14. The off-road vehicle according to claim 13, wherein
the inlet faces in a longitudinal direction of the vehicle and is located ahead of the one of the cage members in the longitudinal direction of the vehicle, and
the outlet faces in a transverse direction of the vehicle and is located behind the one of the cage members in the longitudinal direction of the vehicle.

* * * * *